No. 813,973. PATENTED FEB. 27, 1906.
W. E. KENT.
DRAFT EQUALIZER.
APPLICATION FILED MAR. 13, 1905.
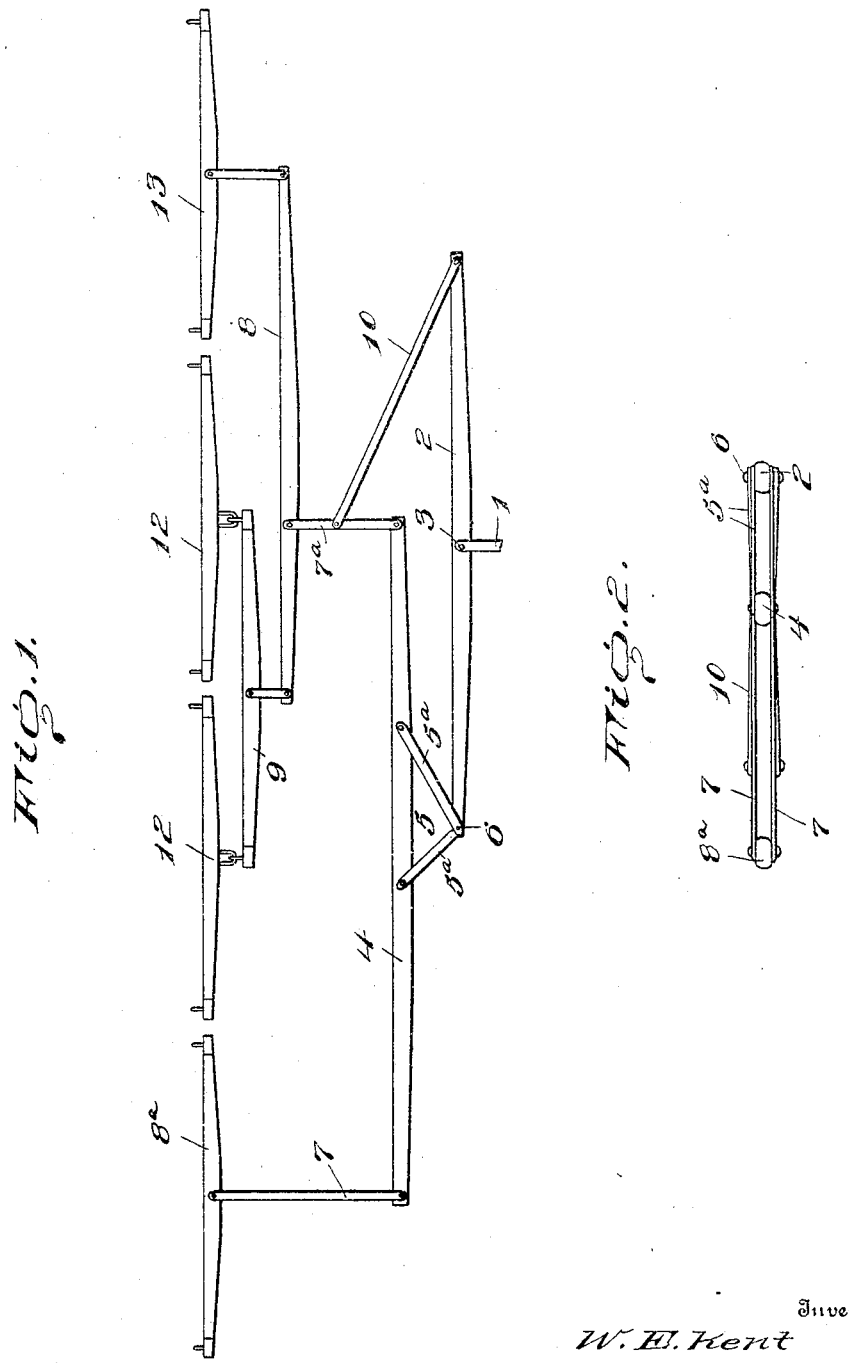

UNITED STATES PATENT OFFICE.

WILLIAM E. KENT, OF HARLAN, IOWA.

DRAFT-EQUALIZER.

No. 813,973.  Specification of Letters Patent.  Patented Feb. 27, 1906.

Application filed March 13, 1905. Serial No. 249,853.

*To all whom it may concern:*

Be it known that I, WILLIAM E. KENT, a citizen of the United States, residing at Harlan, in the county of Shelby and State of Iowa, have invented certain new and useful Improvements in Draft-Equalizers, of which the following is a specification.

This invention relates to improvements in that type of draft-equalizing devices particularly adapted for use with agricultural implements or the like and admitting of disposition of three draft-animals at one side of the tongue or line of draft and one upon the opposite side. It may also be attached to plows, allowing one horse to walk in furrow and three on land.

Simplicity and cheapness of construction constitute an essential feature of the device comprising this invention, greatly increasing the desirability of the same in practical use.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a top plan view of an equalizer embodying the invention. Fig. 2 is a side elevation.

Corresponding and like parts are referred to in the following description and indicated in both views of the drawings by the same reference characters.

Referring to the drawings, the numeral 1 indicates the draft-bar, which may be of any substantial structure, the draft-equalizing devices being attached thereto, as is customary in this class of inventions. Pivoted to the front portion of the bar 1 is a transverse draft-beam 2, the point of the pivotal connection being approximately intermediate the ends of said beam, as shown at 3. An evener-bar 4 is disposed in advance of the beam 2, and projected from the bar 4 somewhat nearer one end than the other is a brace 5, consisting of angularly-extending brace members $5^a$, attached at one end to the bar 4 and secured together at the opposite ends by means of a suitable fastening 6. The fastening forms a pivot member passing through one end of the beam 2 to afford pivotal connection between this beam and the evener-bar 4. Links 7 and $7^a$, which may compose upper and lower plates, are pivoted to the ends of the bar 4, and the link 7 connects with a swingletree $8^a$ of any conventional construction. The link $7^a$ near the draft-bar 1 is approximately in line with this tongue when the draft is applied, and this link is connected with the end of the beam 2 opposite that connected with the brace 5 by means of a long link 10. The member 10 may also be comprised of upper and lower plates suitably attached at the ends thereof to the parts 2 and $7^a$ above mentioned. The link $7^a$ connects a three-horse evener to the bar 4, said evener comprising an equalizing-bar 8, a doubletree 9, connected to one end of the bar 8, swingletrees 12 for the part 9, and a swingletree 13, connected to the opposite end of the bar 8. The member 8 is connected with the adjacent link $7^a$, and the same is arranged with the bar 1 opposite a point between the ends thereof. The peculiar connection between the evener-bar 4 and the draft-beam 2 and the parts 8 and 4 afford a distribution of the draft upon the draft-animals which is equal with respect to the load of each animal. The brace 5 is rigid with the evener-bar 4, though the beam 2 is adapted for a certain amount of pivotal movement with reference to said bar 4.

Having thus described the invention, what is claimed as new is—

In a draft-equalizer, the combination of the bar 1, the beam 2, the equalizing-bar 4, the rigid brace 5 composed of the angularly-extending elements $5^a$ pivotally connecting the bar 4 to the beam 2, the links 7 and $7^a$, the swingletree $8^a$ and evener parts 8, 9, 12 and 13, connected with said links 7 and $7^a$, and the equalizing-link 10 connecting the beam 2 to the adjacent link $7^a$.

In testimony whereof I affix my signature in presence of two witnesses.

WILLIAM E. KENT. [L. S.]

Witnesses:
R. L. KENT,
R. D. PROUTY.